United States Patent [19]

Onozawa et al.

[11] Patent Number: 4,767,971

[45] Date of Patent: Aug. 30, 1988

[54] HORIZONTAL BLANKING PULSE GENERATION CIRCUIT USED FOR DISPLAY UNIT WITH CATHODE-RAY TUBE

[75] Inventors: Makoto Onozawa; Kouji Kitou, both of Yokohama; Michitaka Osawa, Fujisawa, all of Japan

[73] Assignee: Hitachi, Ltd., Tokyo, Japan

[21] Appl. No.: 122,341

[22] Filed: Nov. 18, 1987

[30] Foreign Application Priority Data

Nov. 19, 1986 [JP] Japan .................................. 61-274198

[51] Int. Cl.⁴ ............................................. H01J 29/52
[52] U.S. Cl. .................................................. 315/384
[58] Field of Search ....................... 315/384, 385, 386; 358/33

[56] References Cited

U.S. PATENT DOCUMENTS 4,529,916 7/1985 Nozawa .............................. 315/385

FOREIGN PATENT DOCUMENTS 57-183182 11/1982 Japan .

Primary Examiner—Theodore M. Blum
Attorney, Agent, or Firm—Antonelli, Terry & Wands

[57] ABSTRACT

A blanking pulse generation circuit for generating a blanking pulse with a large duration is disclosed. The blanking pulse generation circuit includes a flyback pulse shaping circuit for shaping a flyback pulse and generating a rectangular wave signal and a front pulse generation circuit for adding a front pulse to the front edge of the rectangular wave signal. The blanking pulse is formed by the blanking pulse generation circuit for adding a front pulse to the rectangular wave signal.

7 Claims, 8 Drawing Sheets

HORIZONTAL BLANKING PULSE GENERATION CIRCUIT USED FOR DISPLAY UNIT WITH CATHODE-RAY TUBE

BACKGROUND OF THE INVENTION

The present invention relates to a horizontal blanking pulse generation circuit used for a display unit having a cathode-ray tube.

A conventional horizontal blanking pulse generation circuit is disclosed in JP-A-57-183182. In this conventional circuit, a flyback pulse generated in a horizontal deflection output circuit is clipped at a predetermined potential thereby to form a horizontal blanking pulse.

The conventional television receivers feature what is called an "overscanning" in which the size of the raster scanned on the face plate of the CRT (Cathode-Ray Tube) is larger than the face plate of the CRT. In a display unit used for a computer terminal or the like, however, what is called an "underscanning" is a common phenomenon in which the size of the raster scanned is smaller than the face plate of the CRT. A display unit of this underscanning poses a problem described below.

The electron beam is reversed in scanning direction and therefore temporarily stops scanning at the ends of the raster scanned on the face plate of the display unit. Unless a blanking pulse is correctly formed, therefore, the brightness of the raster is extremely increased by the temporarily stopped electron beam at the ends of the raster scanned, and a bright spot is observed at the ends of the face plate. No bright spot would occur at the sides of the raster, if a blanking pulse is formed correctly. Actually, however, the delay time of a circuit for transmitting the horizontal blanking pulse causes a phase delay of the blanking pulse, with the result that the bright spot at the right edge of the raster is not easily erased.

The above-mentioned problem is specifically explained with reference to FIG. 8.

Figure 8:
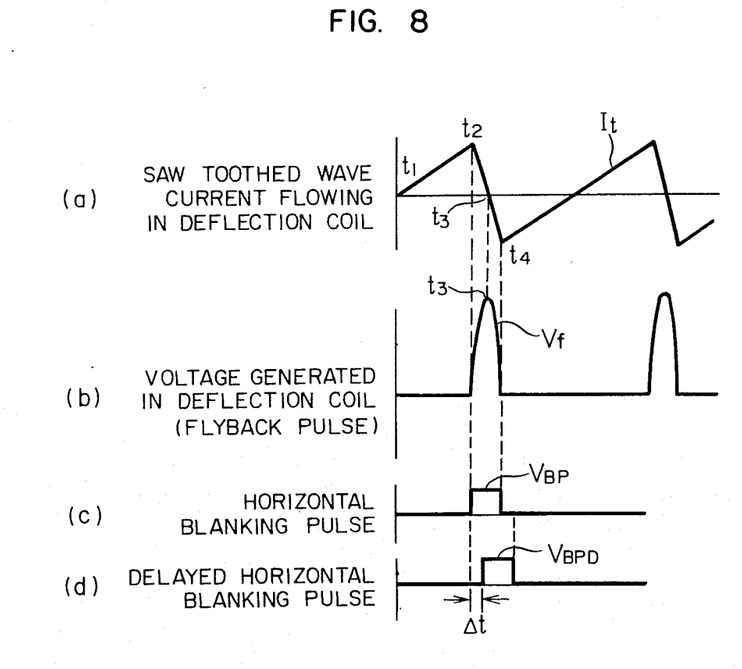
FIG. 8 shows waveforms of the current and voltage generated in the essential parts of a horizontal output circuit of a television receiver.

Waveforms of the voltage and current generated in the essential parts of a horizontal output circuit are shown in FIG. 8. As seen from FIG. 8(a), a saw-toothed wave current $I_t$ flows in a deflection coil mounted on the CRT to perform the horizontal scanning of the raster on the screen. The raster is located at the right end of the face plate at time point $t_2$, and at the left end of the face plate at time point $t_4$. The portion between time points $t_2$ and $t_4$ corresponds to the blanking period.

FIG. 8(b) shows a voltage waveform of a flyback pulse $V_f$ generated between the time points $t_2$ and $t_4$. In a conventional circuit, this waveform of the flyback pulse voltage $V_f$ is used to form a horizontal blanking pulse $V_{BP}$ as seen from FIG. 8(c).

Assume that this horizontal blanking pulse $V_{BP}$ is delayed by the time $\Delta t$ as seen in FIG. 8(d). This delayed horizontal blanking pulse $V_{BPD}$ is able to erase the bright spot generated at the left end (time point $t_4$) on the face plate, but not the bright spot generated at the right end (time $t_2$) of the screen.

SUMMARY OF THE INVENTION

The object of the present invention is to provide a horizontal blanking pulse generation circuit which has a sufficient pulse width to erase the bright spot at the right end of the raster even when the horizontal blanking pulse is delayed in phase.

According to the present invention, there is provided a horizontal blanking pulse generation circuit comprising front pulse adder means for adding a front pulse (phase-advanced pulse) with a duration of $\Delta t_1$ to the front of a rectangular wave signal produced from a flyback pulse. The blanking pulse is formed by adding a front pulse to the rectangular wave signal. The duration $\Delta t_1$ of the front pulse is sufficiently long to prevent any bright spot from being generated at the right end of the raster even when the blanking pulse develops a delay time $\Delta t$. ($\Delta t_1 > \Delta t$)

Preferably, a horizontal blanking pulse generation circuit according to the present invention also comprises rear pulse adder means for adding a rear pulse (phase-delayed pulse) with the duration of $\Delta t'$ at the rear end of the rectangular wave signal. In this case, a blanking pulse is formed by adding a front pulse and a rear pulse to the rectangular wave signal.

DESCRIPTION OF THE PREFERRED EMBODIMENTS

Figure 1:
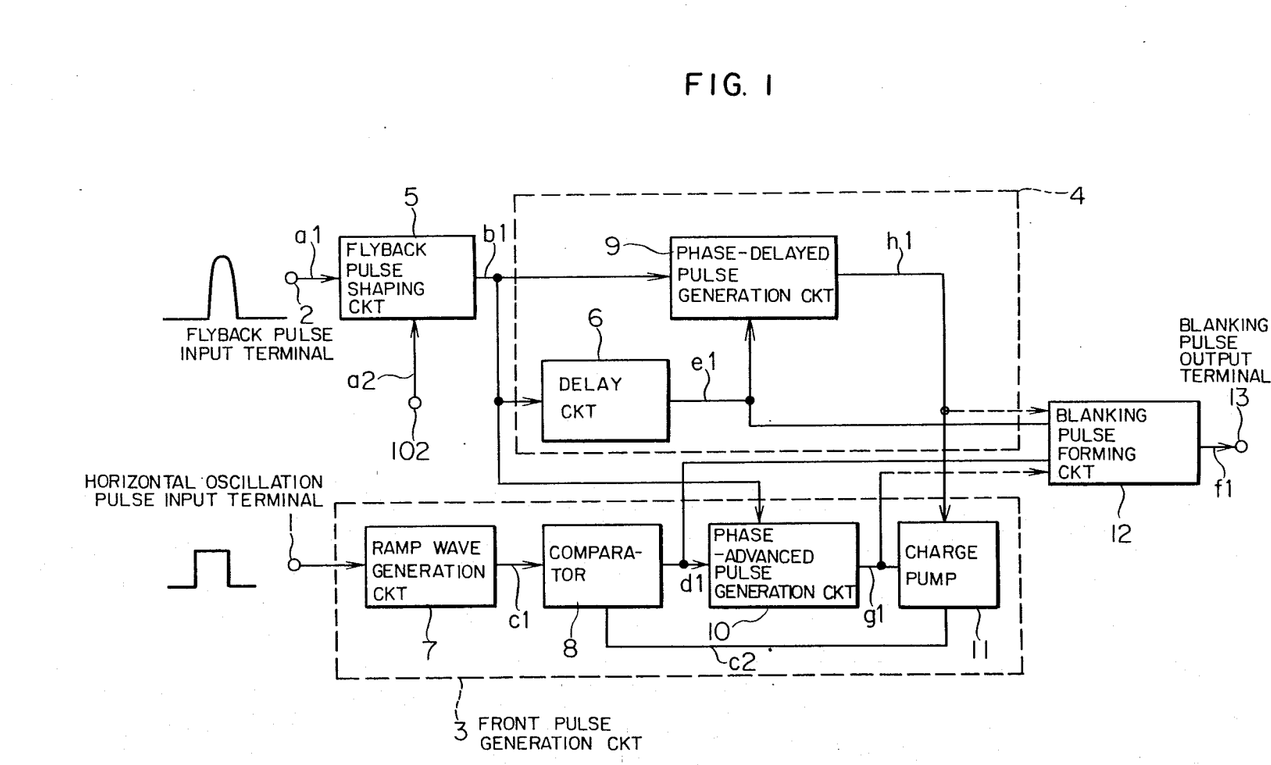
FIG. 1 is a block diagram showing a first embodiment of the present invention.

A horizontal blanking pulse generation circuit according to a first embodiment of the present invention is shown in FIG. 1. In FIG. 1, an input terminal 1 is supplied with a horizontal oscillation pulse from a horizontal oscillation circuit, and an input terminal 2 with a flyback pulse from a flyback transformer. Reference numeral 3 designates a front pulse generation circuit, numeral 4 a rear pulse generation circuit, numeral 5 a flyback shaping circuit, numeral 6 a delay circuit, numeral 7 a ramp wave generation circuit, numeral 8 a comparator, numeral 9 a phase-delayed signal generation circuit, numeral 10 a phase-advanced signal generation circuit, numeral 11 a charge pump circuit, numeral 12 a blanking pulse forming circuit, and numeral 13 a blanking pulse output terminal.

The front pulse generation circuit 3 includes the ramp wave generation circuit 7, the comparator 8, the phase-advanced signal generation circuit 10 and the charge pump 11. The rear pulse generation circuit 4 includes the phase-delayed signal generation circuit 9 and the delay circuit 6.

Figure 2:
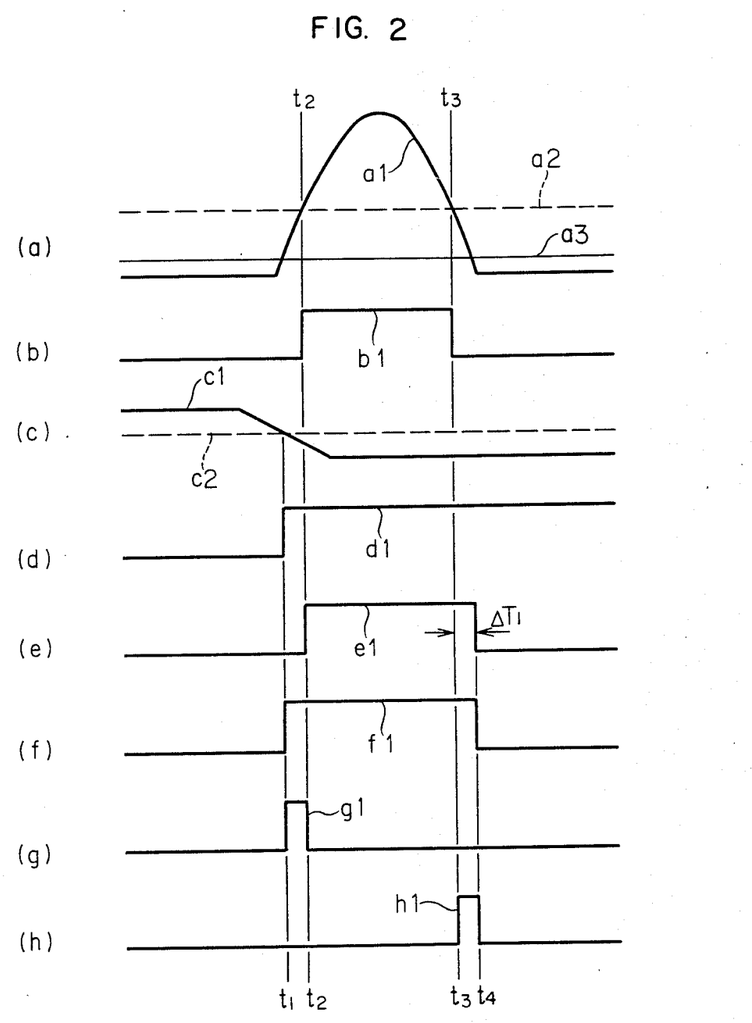
FIG. 2 is a diagram showing waveforms for explaining the operation of the embodiment of FIG. 1.

The flyback pulse shaping circuit 5 compares a flyback pulse a1 (FIG. 2(a)) supplied to the flyback pulse input terminal 2 with a reference voltage a2 (FIG. 2(a)) supplied to a terminal 102 and forms a rectangular wave b1 shown in FIG. 2(b).

In FIG. 2(a), the voltage level a3 represents an average voltage of the flyback pulse a1. The flyback pulse a1 crosses the reference voltage a2 at time points $t_2$, $t_3$. In the process, the pulse duration or pulse period ($t_2$ to $t_3$) of the rectangular wave signal b1 is set by the value of the reference voltage a2.

The delay circuit 6 delays the rear edge of the rectangular wave signal b1 and forms a rear edge-controlled pulse e1 shown in FIG. 2(e). The phase-delayed pulse generation circuit 9, on the other hand, forms a phase-delayed pulse h1 shown in FIG. 2(h) from the rectangular wave signal b1 and the rear edge-controlled pulse e1.

The ramp wave generation circuit 7 forms a ramp wave signal c1 shown in FIG. 2(c) from the horizontal oscillation pulse applied by way of the horizontal oscillation pulse input terminal 1. The comparator 8 compares the ramp wave signal c1 with the front edge-controlled voltage c2 as shown in FIG. 2(c), and forms a front edge-controlled pulse d1. The phase-advanced signal generation circuit 10 forms a phase-advanced pulse g1 shown in FIG. 2(g) from the rectangular wave signal b1 and the front edge-controlled pulse d1.

The blanking pulse forming circuit 12 forms a horizontal blanking pulse f1 shown in FIG. 2(f) from the front edge-controlled pulse d1 and the rear edge-controlled pulse e1, and produces the horizontal blanking pulse f1 at the blanking pulse output terminal 13.

The front pulse generation 3 including the phase-advanced signal generation circuit 10, the charge pump 11, the ramp wave generation circuit 7 and the comparator 8 controls the duration of the phase-advanced pulse in such a manner that the phase-advanced pulse g1 may have substantially the same duration as the phase-delayed pulse h1.

The charge pump 11 includes therein a capacitor not shown, which capacitor is discharged for a period corresponding to the phase-advanced pulse g1 applied thereto and is charged for a period corresponding to the phase-delayed pulse h1 applied in the next moment. As a result, the amount of residual charges of the capacitor is proportional to the difference in pulse duration between the pulses g1 and h1, and the charge pump 11 converts the amount of residual charges into a voltage and produces the voltage as a front edge-controlled voltage c2.

The comparator 8, supplied with the front edge-controlled voltage c2, controls the phase of the front edge-controlled pulse d1 in such a manner that the pulse duration of the phase-advanced pulse g1 may be the same as that of the phase-delayed pulse h1.

In this way, according to the first embodiment of the present invention, the delay circuit 6 functions to keep the phase delay (the portion between $t_3$ and $t_4$ in FIG. 2) constant, and therefore the amount of phase advance is also kept constant (the portion between $t_1$ and $t_2$ in FIG. 2), thereby rendering the phase relationship always fixed between the horizontal blanking pulse f1 and the flyback pulse a1.

As an alternative to the rear edge-controlled pulse e1 supplied to the blanking pulse forming circuit 12, the phase-delayed pulse h1 may be used, or the phase-advanced pulse g1 may replace the front edge-controlled pulse d1 with equal effect.

Figure 3:
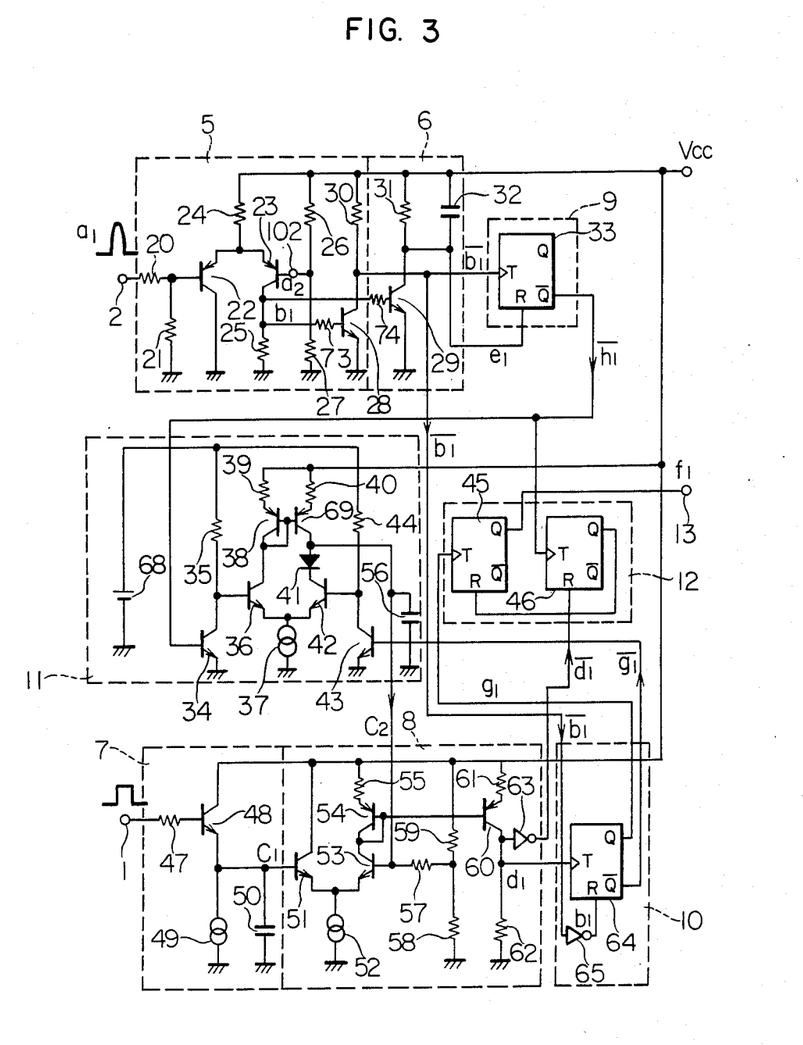
FIG. 3 shows a specific circuit according to the first embodiment of the present invention.

Now, a diagram of a specific circuit of the first embodiment of the present invention is shown in FIG. 3.

In FIG. 3, the flyback pulse shaping circuit 5 shown in the block diagram of FIG. 1 includes resistors 20, 21, 24, 25, 26, 27, 73, and transistors 22, 23, 28; the delay circuit 6 includes resistors 74, 31, a capacitor 32, and a transistor 29; the ramp wave generation circuit 7 includes a resistor 47, a transistor 48, a constant current source 49, and a capacitor 50; the comparator 8 includes transistors 51, 53, 54, 60, resistors 55, 57, 58, 59, 61, 62, a constant current source 52, and an inverter 63; the phased-delayed pulse generation circuit 9 includes a flip-flop 33; the phase-advanced pulse generation circuit 10 includes a flip-flop 64 and an inverter 65; the blanking pulse forming circuit 12 includes flip-flops 45, 46; and the charge pump circuit 11 includes resistors 35, 39, 40, 44, transistors 34, 36, 38, 69, 42, 43, a diode 41, a capacitor 56, a current source 37 and a voltage source 68. The "capacitor not shown" of the charge pump 11 described above is represented by a capacitor 56 in FIG. 3.

The flip-flops 33, 45, 46, 64 are triggered and set by the leading edge of the signal applied to the T terminal and reset at the high (H) level of the signal applied to the R terminal.

The flyback pulse a1 applied to the input terminal 2 is divided in voltage by the resistors 20, 21, and supplied to the transistor 22. The transistor 23 is supplied with a reference voltage a2 formed by the resistors 26, 27. When the voltage of the base of the transistor 22 becomes higher than the reference voltage a2 at time point $t_2$, the transistor 22 turns off and the transistor 23 turns on. When the voltage of the base of the transistor 22 becomes higher than the reference voltage a2 at time point $t_3$, on the other hand, the transistor 22 turns on and the transistor 23 turns off. The rectangular wave signal b1 produced at the collector of the transistor 23 is supplied through the transistor 28 to the phase-delayed pulse generation circuit 9 and the phase-advanced pulse generation circuit 10. Also, the rectangular wave signal b1 is delayed by the delay time $\Delta T_1$ by the resistor 31 and the capacitor 32 through the transistor 29, and the resultant rear edge-controlled pulse e1 is applied to the phase-delayed pulse generation circuit 9. The flip-flop 33 of the phase-delayed pulse generation circuit 9 is triggered by an inverted rectangular wave signal $\overline{b1}$ and reset by the pulse e1 thereby to generate a phase-delayed pulse h1. The phase-delayed pulse h1 is supplied to the charge pump 11 and the blanking pulse generation circuit 12.

The transistor 34 of the charge pump 11 is cut off by an inverted phase-delayed pulse $\overline{h1}$. The transistor 36 then turns on, and current begins to flow in the transistors 38, 69. The current flowing through the transistor 69 charges the capacitor 56. The transistor 43 is cut off by the phase-advanced pulse g1 inverted. The transistor 42 is then turned on and the charges in the capacitor 56 are discharged through the diode 41. If the amount of charges supplied to the capacitor 56 through the transistor 69 is greater than that of charged discharged through the transistor 42 from the capacitor 56, the front edge controlled voltage $C_2$ is increased. As a result, the duration of the phase-advanced pulse g1 becomes almost equal to that of the phase-delayed pulse h1.

The transistor 48 of the ramp wave signal generation circuit 7 charges the capacitor 50 by being turned on in response to the horizontal oscillation signal supplied to the input terminal 1. When the transistor 48 turns off, the charges in the capacitor 50 are slowly discharged through the current source 49 until the voltage across the capacitor 50 finally becomes a ramp wave.

The comparator 8 compares the voltage of the ramp wave signal $C_1$ with the front edge controlled voltage $C_2$. If the voltage of the ramp wave signal $C_1$ is higher than the front edge controlled voltage $C_2$, the transistor 51 turns on and the transistors 53, 54, 60 turn off. In the case where the front edge controlled voltage $C_2$ is higher than the voltage of the ramp wave signal $C_1$, by contrast, the transistor 51 turns off and the transistors 53, 54 and 60 turn on. When the transistor 60 turns on at time point $t_1$, the front edge controlled pulse d1 is generated. This front edge controlled pulse d1 is supplied to the phase-advanced pulse generation circuit 10 and the blanking pulse forming circuit 12.

The flip-flop 64 of the phase-advanced pulse generation circuit 10 is triggered by the front edge controlled pulse d1 at time point $t_1$, and reset by the rectangular wave signal b1 at time point t2 thereby to generate the phase-advanced pulse g1.

The flip-flop 45 of the blanking pulse forming circuit 12 is triggered by the phase-advanced pulse g1 at time point $t_1$ and reset by the flip-flop 46 at time point $t_4$. The flip-flop 46 is triggered by the inverted phase-delayed pulse h1 at time point $t_4$, and reset by the inverted front edge controlled pulse d1 at time point $t_1$. The blanking pulse forming circuit 12 generates a blanking pulse f1 during the period between time points $t_1$ and $t_4$. This blanking pulse f1 has a sufficient width to erase the bright spot of the raster in full.

Figure 4:
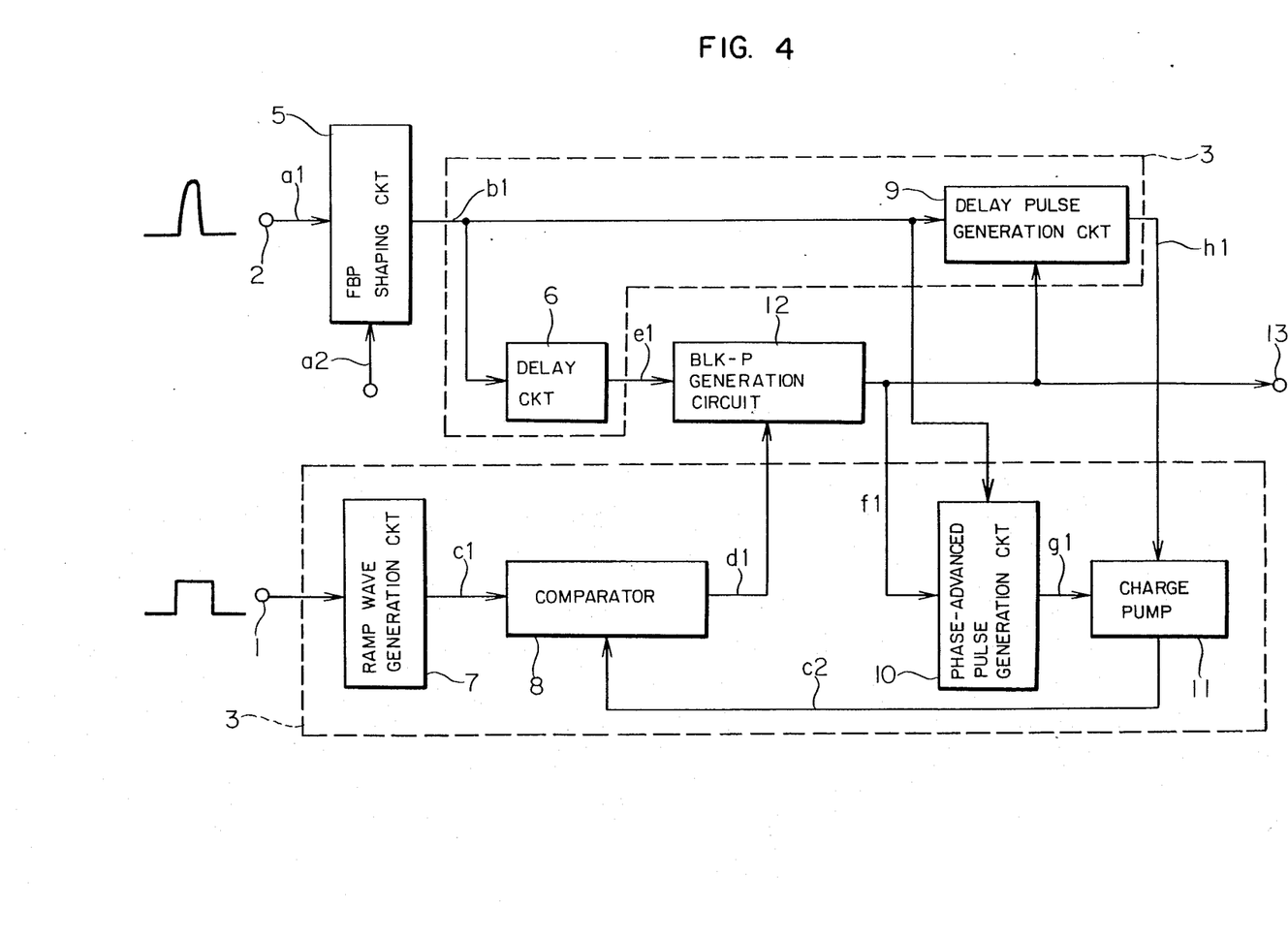
FIG. 4 is a block diagram showing a second embodiment of the present invention.
Figure 5:
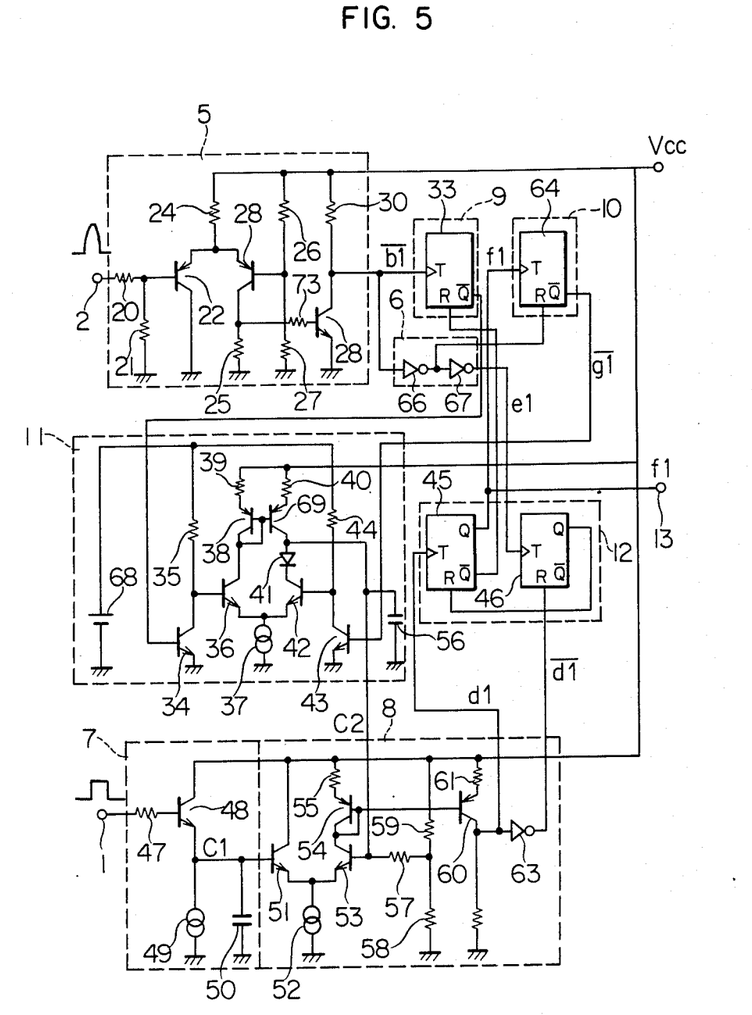
FIG. 5 shows a specific circuit according to the second embodiment of the present invention.

A second embodiment of the present invention is shown in FIGS. 4 and 5.

This second embodiment shown in FIG. 4, unlike in the first embodiment shown in FIG. 1, directly uses the horizontal blanking pulse f1 produced from the blanking pulse forming circuit 12 as an input signal to the phase-advanced pulse generation circuit 10 and the phase-delayed pulse generation circuit 9.

A specific circuit according to the second embodiment is shown in FIG. 5. The circuit shown in FIG. 5 uses inverters 66, 67 as the delay circuit 6 in FIG. 4. The basic operation of the circuit shown in FIG. 5 is substantially identical to that of the first embodiment shown in FIG. 3.

Figure 6:
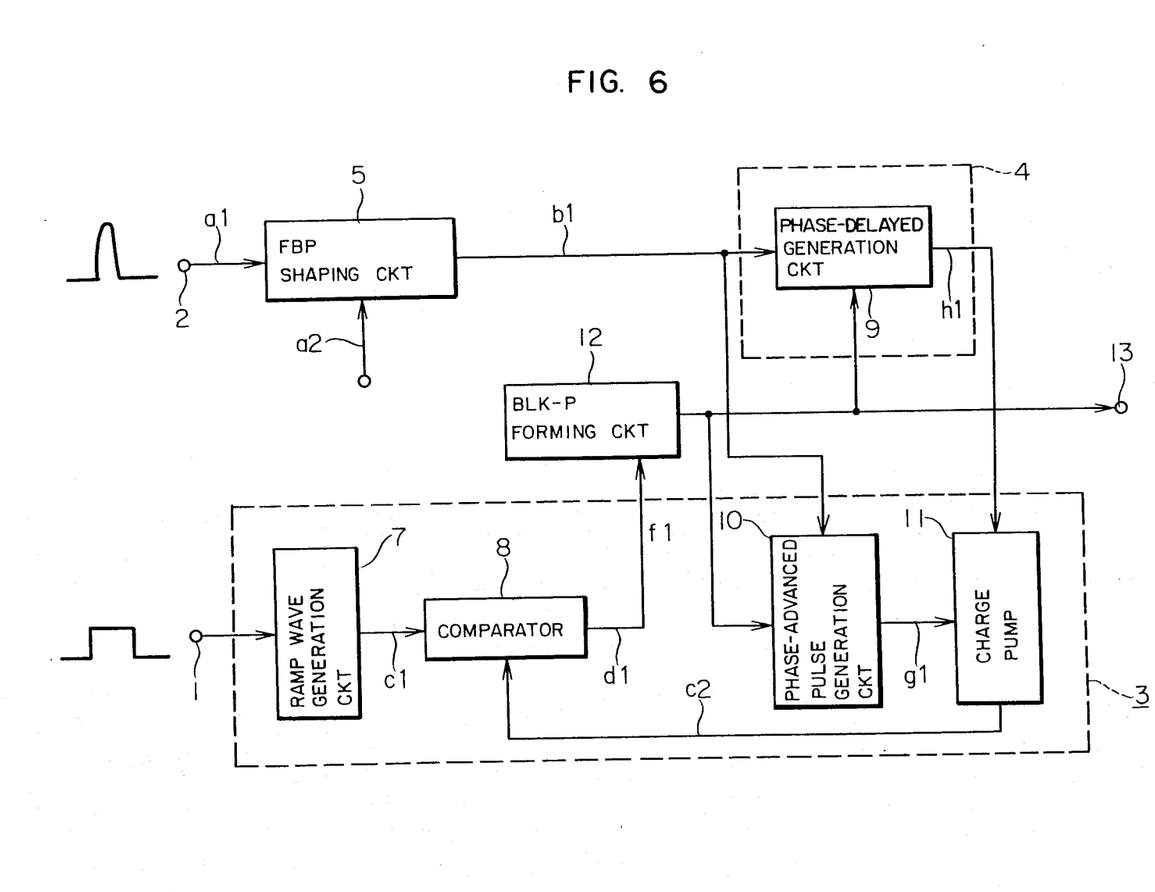
FIG. 6 shows a block diagram of a third embodiment of the present invention.
Figure 7:
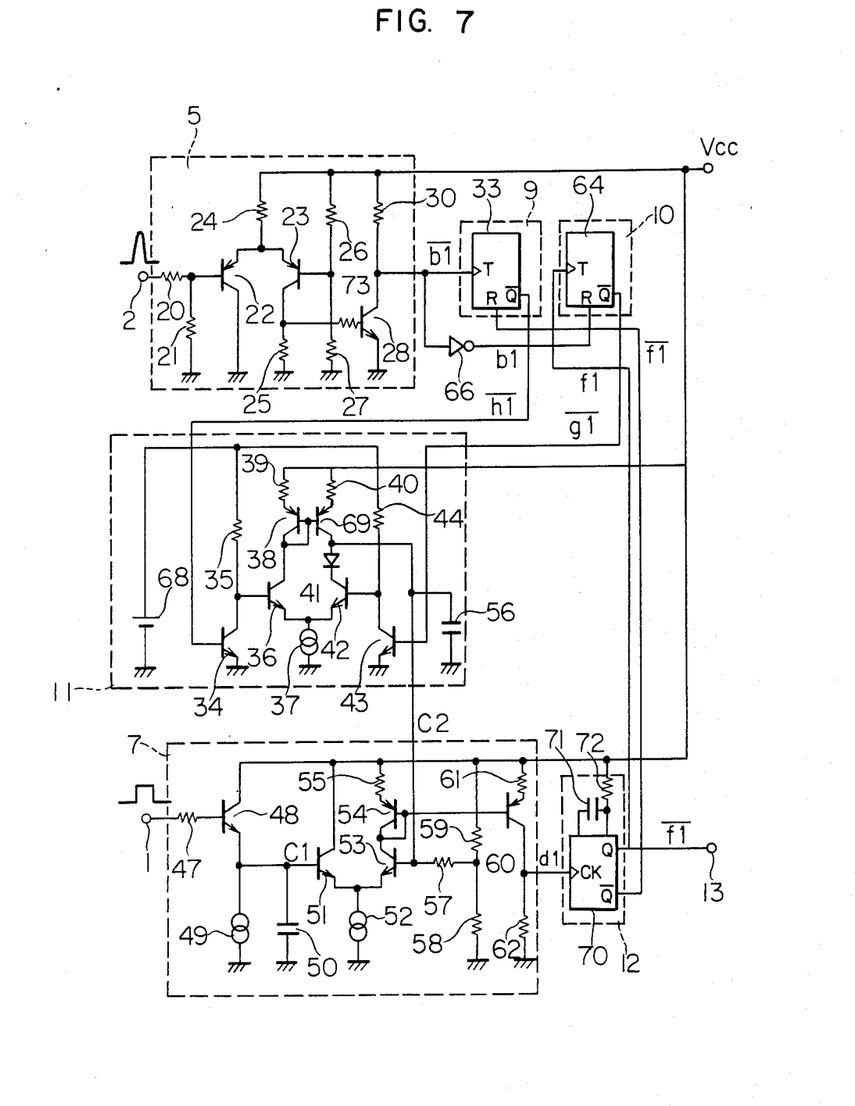
FIG. 7 is a specific circuit diagram showing the third embodiment of the present invention.

A third embodiment of the present invention is shown in FIGS. 6 and 7. The third embodiment shown in FIG. 6 does not include any delay circuit 6, and uses a monostable multivibrator as the blanking pulse forming circuit 12.

A specific circuit of this third embodiment is shown in the circuit diagram of FIG. 7. In the circuit shown in FIG. 7, a monostable multivibrator 70 is used as the blanking pulse forming circuit 12, and the duration of the horizontal blanking pulse is set by a capacitor 71 and a resistor 72. The pulse duration of the horizontal blanking pulse of this third embodiment is capable of being set freely.

It will thus be understood from the foregoing description that according to the present invention a pulse can be added to the front edge of a rectangular wave signal produced from a flyback pulse, and the blanking pulse duration is increased, thereby preventing a bright spot from being generated at the right edge of the raster.

We claim:

1. A horizontal blanking pulse generation circuit used for a display unit having a cathode-ray tube, comprising:
   (a) a flyback pulse shaping circuit for receiving a flyback pulse and shaping said flyback pulse at a predetermined voltage thereby to generate a rectangular wave signal,
   (b) a rear pulse generation circuit connected to the flyback pulse shaping circuit and supplied with a rectangular wave signal from said flyback pulse shaping circuit for producing a pulse delayed in phase behind the rectangular wave signal,
   (c) a front pulse generation circuit including a ramp wave signal generation circuit for receiving a horizontal oscillation pulse and converting said horizontal oscillation pulse into a ramp wave signal, a charge pump circuit connected to the rear pulse generation circuit for receiving a phase-delayed pulse, a comparator circuit connected to the ramp wave signal generation circuit and the charge pump circuit for comparing the voltage value of the ramp wave signal with the voltage value of an output signal of the charge pump circuit and generating a front pulse when said two signals coincide with each other, and a phase-advanced pulse generation circuit supplied with a signal synchronous with the output signal of the comparator circuit and the rectangular wave signal of the flyback pulse shaping circuit for producing a phase-advanced pulse having a duration corresponding to the phase difference between the synchronous signal and the rectangular wave signal, said charge pump circuit producing the output signal proportional to the difference between the duration of the phase-delayed pulse of the rear pulse generation circuit and the duration of the phase-advanced pulse of the phase-advanced pulse generation circuit and supplying the output to the comparator circuit, and
   (d) a blanking pulse generation circuit connected to the front pulse generation circuit and the rear pulse generation circuit for generating a blanking pulse starting with the front edge of a front pulse generated by the front pulse generation circuit and ending with the rear edge of a rear pulse generated by the rear pulse generation circuit.

2. A horizontal blanking pulse generation circuit according to claim 1, wherein said phase-advanced pulse generation circuit is connected to the comparator circuit and supplied with an output signal of the comparator circuit.

3. A horizontal blanking pulse generation circuit according to claim 1, wherein the phase-advanced pulse generation circuit is connected to the blanking pulse generation circuit and is supplied with an output signal of the blanking pulse generation circuit.

4. A horizontal blanking pulse generation circuit according to claim 1, wherein the rear pulse generation circuit is connected to the flyback pulse shaping circuit and includes a delay circuit for delaying the rectangular wave signal generated by the flyback pulse shaping circuit by a predetermined time length and a phase-delayed pulse generation circuit for generating a phase-delayed pulse having a duration corresponding to the difference between the rectangular wave signal and a delayed rectangular wave signal delayed in the delay circuit.

5. A horizontal blanking pulse generation circuit used for a display unit having a cathode-ray tube, comprising:
   (a) a flyback pulse shaping circuit for receiving a flyback pulse and shaping said flyback pulse at a predetermined voltage thereby to generate a rectangular wave signal,
   (b) a rear pulse generation circuit connected to the flyback pulse shaping circuit and supplied with a rectangular wave signal from said flyback pulse shaping circuit thereby to generate a phase-delayed pulse delayed in phase behind the rectangular wave signal, (c) a front pulse generation circuit including a ramp wave signal generation circuit for receiving a horizontal oscillation pulse and converting said horizontal oscillation pulse into a ramp wave signal, a charge pump circuit connected to the rear pulse generation circuit for receiving a phase-delayed pulse, a comparator circuit connected to the ramp wave signal generation circuit and the charge pump circuit for comparing the voltage value of the ramp wave signal with the voltage value of an output signal of the charge pump circuit and generating a front pulse when said two signals coincide with each other, and a phase-advanced pulse generation circuit supplied with a signal synchronous with the output signal of the comparator circuit and the rectangular wave signal of the flyback pulse shaping circuit for producing a phase-advanced pulse having a duration corresponding to the phase difference between the synthronous signal and the rectangular wave signal, said charge pump circuit producing said output signal proportional to the difference between the duration of the phase-delayed pulse of the rear pulse generation circuit and the duration of the phase-advanced pulse of the phase-advanced pulse generation circuit and supplying the output to the comparator circuit, and (d) a blanking pulse generation circuit connected to said front pulse generation circuit for generating a blanking pulse having a predetermined duration starting with the front edge of a front pulse generated by the front pulse generation circuit.

6. A horizontal blanking pulse generation circuit according to claim 5, wherein said phase-advanced pulse generation circuit is connected to the comparator circuit and supplied with an output signal of the comparator circuit.

7. A horizontal blanking pulse generation circuit according to claim 5, wherein said phase-advanced pulse generation circuit is connected to the blanking pulse generation circuit and supplied with an output signal of the blanking pulse generation circuit.

* * * * *